United States Patent
Krom et al.

(10) Patent No.: US 7,241,839 B2
(45) Date of Patent: Jul. 10, 2007

(54) REACTION PRODUCT DERIVED FROM AMINE-FUNCTIONALIZED ELASTOMERS AND MALEATED POLYOLEFINS

(75) Inventors: James A. Krom, Cleveland Heights, OH (US); Xiaorong Wang, Akron, OH (US)

(73) Assignee: Bridgestone Corporation, Chuo-ku, Tokyo (JP)

(*) Notice: Subject to any disclaimer, the term of this patent is extended or adjusted under 35 U.S.C. 154(b) by 128 days.

(21) Appl. No.: 11/205,926

(22) Filed: Aug. 17, 2005

(65) Prior Publication Data

US 2006/0036031 A1 Feb. 16, 2006

Related U.S. Application Data

(62) Division of application No. 09/097,035, filed on Jun. 12, 1998, now Pat. No. 7,056,979.

(51) Int. Cl.
C08L 35/00 (2006.01)
(52) U.S. Cl. ............... 525/207; 525/221; 525/232
(58) Field of Classification Search ............ 525/207, 525/221, 232
See application file for complete search history.

(56) References Cited

U.S. PATENT DOCUMENTS

| | | | |
|---|---|---|---|
| 4,409,365 A | 10/1983 | Coran et al. | |
| 4,592,960 A | 6/1986 | Inoue et al. | |
| 4,622,352 A | 11/1986 | Dijauw et al. | |
| 5,055,527 A | 10/1991 | Bronstert et al. | |
| 5,066,729 A | 11/1991 | Stayer, Jr. et al. | |
| 5,118,761 A | 6/1992 | Dharmarajan et al. | |
| 5,153,159 A | 10/1992 | Antkowiak et al. | |
| 5,153,271 A | 10/1992 | Lawson et al. | |
| 5,227,431 A | 7/1993 | Lawson et al. | |
| 5,268,413 A | 12/1993 | Antkowiak et al. | |
| 5,274,106 A | 12/1993 | Lawson et al. | |
| 5,280,064 A | 1/1994 | Hesp et al. | |
| 5,310,798 A | 5/1994 | Lawson et al. | |
| 5,354,822 A | 10/1994 | Antkowiak et al. | |
| 5,491,230 A | 2/1996 | Lawson et al. | |
| 5,494,976 A | 2/1996 | Bender et al. | |
| 5,496,940 A | 3/1996 | Lawson et al. | |
| 5,567,774 A | 10/1996 | Schwindeman et al. | |
| 5,705,564 A | 1/1998 | Liang et al. | |
| 5,708,061 A | 1/1998 | Hesp et al. | |
| 5,962,573 A | 10/1999 | Berta | |

FOREIGN PATENT DOCUMENTS

| | | |
|---|---|---|
| DE | 31 40 565 | 4/1983 |
| EP | 0 283 731 A | 9/1988 |
| EP | 0 298 370 A | 1/1989 |
| EP | 563956 A2 | 6/1993 |
| EP | 0 624 623 A1 | 11/1994 |
| JP | 53055343 | 5/1978 |
| JP | 56072037 | 6/1981 |
| JP | 01123597 | 5/1985 |
| JP | 03095263 | 4/1991 |
| JP | 06128432 A | 5/1994 |

OTHER PUBLICATIONS

J. F. Klebe, H. Finkbeiner, and D.M. White, "Silylations with Bis(trimethylsilyl) acetamide a Highly Reactive Silyl Donor", *Journal of the American Chemical Society* by the American Chemical Society: WEashingotn, D.C., vol. 88: 14, pp. 3390-3395, Jul. 20, 1996.

Joachim Rösch and Rolf Mülhaupt, "Comparison of maleic anhydride-grafted poly(propylene) with maleic anhydride-grafted poly-styrene-block-poly(ethene-co-but-1-ene)-block-polystyrene as blend compatibilizers of poly(propylene)/polyamide-6 blends", *Makromol. Chem., Rapid Commun.*, vol. 14, pp. 503-509, published by Huthig & Wepf Verlag Basel, Apr. 5, 1993.

Section CH, Week 199348, Derwent Publications Ltd., London, GB; AN 1993-383144; XP002118605 & JP 05 287078 A (Tomoegawa Paper Mfg. Co. Ltd.) Nov. 2, 1993—Abstract.

Fumio Ide and Akira Hasegawa, "Studies on polymer blend nylon 6 and polypropylene or nylon 6 and polystyrene using the reaction of polymer", Journal of Applied Polymer Science, vol. 18, pp. 963-974, published by John Wiley & Sons, Inc., New York, New York, Jan. 1, 1974.

H.L. Hsieh and R. P. Quirk, Chapter: "Functionalized Polymers and Macromonomers" in *Anionic Polymerization Principles and Practical Applications*, pp. 271-306, published by Marcel Dekker, Inc., New York, New York, Jan. 1, 1996.

*Primary Examiner*—Bernard Lipman
(74) *Attorney, Agent, or Firm*—Meredith E. Hooker; Jenny Sheaffer

(57) ABSTRACT

A reaction product is prepared by reacting a first polymer having pendant or terminal carboxyl or anhydride groups with a second polymer (e.g. elastomer) having an amine containing terminal group. The second polymer is anionically polymerized. The second polymer is functionalized by reacting the growing anionic chain end with an imine. Then a protic terminating agent terminates the growing chain end. The first and second polymers are reacted by mixing (desirably above their softening temperatures) and forming a blend with improved physical properties over a blend of similar polymers lacking a reactive amine group.

6 Claims, No Drawings ic acid or anhydride functionalized polymer. The carboxylic acid or anhydride functionalized polymers, e.g. maleated polyolefins, are available in a variety of microstructures and in a variety of ratios of carboxylic or anhydride, e.g. maleate groups (more correctly succinic anhydride or succinate groups) to repeat units of the polymer, e.g. olefin. While many anionically polymerized polymers and maleated polymers are not inherently compatible, the chemical interaction between the first polymer, e.g. maleated polymers and the second polymer, i.e. amine functionalized polymers in the reaction product opens a possibility of making a variety of blends including useful dispersions of two polymers including a dispersion of a polyolefin in an elastomer, dispersions of an elastomer in a polyolefin, cocontinuous polyolefin and elastomer phases and homogenous compositions or blends of at least one polyolefin and at least one elastomer, etc. In a preferred embodiment the polyolefin is a thermo-plastic which can result in a thermoplastic elastomer when blended in proper proportions with an amine functionalized rubbery polymer.

REACTION PRODUCT DERIVED FROM AMINE-FUNCTIONALIZED ELASTOMERS AND MALEATED POLYOLEFINS

This application is a divisional filing claiming the priority benefit of U.S. application Ser. No. 09/097,035, filed Jun. 12, 1998, now U.S. Pat. No. 7,056,979, the disclosure of which is incorporated herein by reference.

FIELD OF THE INVENTION

A polymer blend is prepared by reacting a first polymer functionalized with one or more pendant carboxyl groups or anhydrides derived from carboxyl groups with a second amine functionalized polymer. An example of such a first polymer is a maleated polyolefin. The amine functionalized polymer is anionically polymerized and functionalized with an amine group. The properties of these reaction products depend upon the weight percent of the first polymer, and the type of the first and second polymers. The molecular weight of the polymer(s) and the number of carboxyl and amine groups per polymer are also anticipated to have an effect on the properties. The reaction product can range from a modified thermoplastic to a elastomer and can be used as a polymer blend or as an additive for another composition. The polymer functionalized with pendant carboxyl or an anhydride is desirably polyethylene or polypropylene.

BACKGROUND OF THE INVENTION

The preparation of maleated polyolefins is known. Three basic methods of maleating polypropylenes are (1) reacting the polyolefin with a maleic anhydride in the presence of a free radical source at elevated temperatures, (2) copolymerizing maleic anhydride with an poly(alphaolefin), and (3) chain scission of a preformed polyolefin polymer in the presence of maleic anhydride to form succinic anhydride (commonly referred to as maleate) terminal groups on the polyolefin.

Amine functionalized elastomers have been prepared to reduce hysteresis in articles such as tires such as taught in U.S. Pat. Nos. 5,153,159; 5,268,413; and 5,066,729, which are hereby incorporated by reference. Generally, these were high molecular weight polymers and were crosslinked into tires with reduced hysteresis.

SUMMARY OF THE INVENTION

Imine compounds such as N-butylidenebenzylamine can be used to functionalize and terminate living anionic polymers. These imine compounds can be used under commercial reaction conditions for the anionic polymerization of elastomers to produce polymers of controlled molecular weight and microstructure having terminal groups containing a secondary amine. The ability to make polymers wherein at least 50, 60 or 70 percent of the polymer chains have at least one terminal functional secondary amine group makes it possible to prepare reaction products thereof (compatibilized blends of two or more polymers) with a first polymer such as a maleated polyolefin or other carboxylic Maleated polyolefins are preferred for the first polymer, but other maleated polymers or polymers functionalized with other carboxylic groups can be used. Desirably at least a majority of the first polymer includes at least one succinate, succinic anhydride, other polycarboxylic acid or anhydride thereof, or other carboxylic acid group or combinations thereof. Amine terminated elastomers from at least one conjugated diene and optionally a vinyl aromatic monomer are preferred for the second polymer. The first or second polymer can be an elastomer or thermoplastic or both polymers can be elastomers or both can be thermoplastics. The anionically polymerized (second) polymer can be prepared having one or more growing ends. Polymers can be functionalized to have one or more amine containing terminal group. Those with two amine containing terminal groups can be used to react with a difunctional or polyfunctional polymer having carboxyl or anhydride or isocyanate functional groups yielding different properties than when monofunctional amine terminated polymers are used.

DETAILED DESCRIPTION

Polymers, e.g., polyolefins, can be prepared with carboxyl groups such as succinate or succinic anhydride groups (derived from maleic anhydride) by a variety of methods. One method is to copolymerize an olefin monomer with an olefinic (unsaturated) carboxyl containing monomer such as acrylic acid, itaconic acid, maleic acid, or maleic anhydride, or blends of carboxyl containing monomers. These functional group containing monomers, which can also be functionalizing agents, desirably have at least one carboxylic group and at least one double bond. They generally have from about 3 to about 10 carbon atoms. Desirably they have from about 1 to about 2 or 3 carboxylic groups and from about 3 to about 6 carbon atoms. They can include unsaturated anhydrides of polycarboxylic acids.

A second approach is to graft an olefinic carboxyl containing monomer as described above (e.g., carboxylic anhydride) to a polymer. The anhydrides of dicarboxylic acids desirably have one anhydride of a dicarboxylic acid and one carbon to carbon double bond that is used in bonding the anhydride to the first polymer. Polymers e.g. polyolefins, with carboxyl groups (such as succinate groups) can be formed by grafting dicarboxylic anhydrides e.g. maleic anhydride, onto an already formed polyolefin. This is usually done at an elevated temperature in the presence of a free radical source.

Polyolefins with terminal and/or pendant carboxyl or anhydride groups prepared by these methods are commercially available. These polymers desirably have from about 0.01 to about 10 weight percent carboxylic acid or anhydride of carboxylic acid containing repeat units. More desirably they have from about 0.01 to about 5 weight percent, and preferably from about 0.01 or 0.02 to about 2 or 3 weight percent of such units.

A third method of forming maleated polymers is a chain scission method wherein a premade polymer, e.g., polyolefin is subjected to high stresses during a mixing operation at elevated temperatures. Maleic anhydride or another olefinic carboxyl containing monomer (as de-scribed above) having at least one carbon to carbon double bond (unsaturated) is added to the mixture. Desirably the maleic anhydride or other monomer is grafted onto the chain scission sites of the polyolefin or other polymer.

Preferred polyolefins for this application are from alpha-monoolefin monomers having from about 2 to about 6 carbon atoms per repeat unit. These polymers can be homopolymers or copolymers wherein polymers include copolymers and polymers having repeat units from three or more different monomers. An example of a terpolymer is EPDM which is derived from the polymerization of ethylene, propylene, and generally a nonconjugated diene such as 1,4-hexadiene or methylene norbornene. An example of a copolymer is ethylene propylene copolymers (EPM). Preferred polyolefins are polyethylene or polypropylene. Desirably the polyolefin has at least 80 weight percent repeat units from the polymerization of at least one alpha-monoolefin monomer having from 2 to 6 carbon atoms and desirably at least 80 weight percent of either ethylene or propylene, or combinations thereof. Desirably the polyolefin is a thermoplastic polymer meaning it either has a Tg above 25° C. or is so crystalline that the crystallinity prevents the polymer from being elastomeric at 24° C., e.g. an elastomer which is capable in crosslinked form of having a recovery to approximately its initial dimension after being elongated to 100 percent elongation under tension.

In an alternate embodiment the carboxylated, e.g. maleated, polymer need not be a polyolefin made from a monoolefin. In some embodiments the maleated polymer can be an elastomeric polymer such as one having at least 40, 50, 60 or 70 weight percent repeat units from a conjugated diene having from about 4 to about 8 carbon atoms. These polymers would include such diene based polymers and polymers of such dienes and vinyl aromatic monomers having from 8 to 20 carbon atoms. These polymers could be polymerized by free radical methods and could include a variety of comonomers such as acrylonitrile, acrylates, diacids, etc. The carboxyl groups could be added as specified for the polyolefins. EPM or EPDM would be other elastomeric types of polymers that could be functionalized with carboxylic acid or an anhydride of a dicarboxylic acid. These maleated elastomeric polymers would be useful instead of poly(alpha-monoolefins) where thermoplastic properties are not generally desired, such as in pneumatic tires.

Olefinic polymers such as from diolefins or copolymers of diolefins and olefins (e.g. the above elastomeric polymers: polybutadiene, polyisoprene, natural rubber, or poly(styrene butadiene)) can be grafted with maleic anhydride by routine modifications as noted above. The above elastomeric polymers can also be partially hydrogenated to eliminate a large percentage of the residual double bonds. Such partially hydrogenated polymers can be grafted with an unsaturated carboxyl containing monomer such maleic anhydride.

The second polymer of the blend is an amine terminated polymer made by anionic polymerization. A preferred group of polymers is a polymer polymerized from at least one conjugated diene having from 4 to 8 carbon atoms, or a combination of at least one of said conjugated dienes and at least one vinyl aromatic monomer having from 8 to 20 carbon atoms. In some embodiments the polymers made from conjugated dienes comprise at least 40 weight percent repeat units from at least one conjugated diene, more desirably at least 50, 65, 70 or 80 weight percent repeat units from at least one corrugated diene. If these polymers are copolymers or polymers of three or more monomers they can optionally comprise at least 20 weight percent repeat units from said vinyl aromatic monomer. A preferred range for repeat units from vinyl aromatic monomers in elastomeric polymers is from about 20 weight to about 35 weight percent of the resulting polymer. In alternate embodiments where elastomeric properties are not desired the repeat units from at least one vinyl aromatic monomer can be at least 40, 50, 60, 70 or 80 weight percent of the polymer. Depending upon the molecular weight and the particular repeat units of the monomer polymerized, the polymers from the above monomers may vary from a viscous liquid to a solid at 24° C. Number average molecular weights may vary from about 1,000 to about 500,000 or more, and are more desirably from about 1,000 to about 250,000 or 300,000 and preferably in one embodiment from about 1,000 to about 30,000 or 50,000 and in another embodiment from about 30,000 or 50,000 to about 250,000 or 300,000.

The amine terminated polymers may have one amine containing terminal group derived from terminating the anionic polymerization with an imine molecule, or they may contain multiple amine groups from such terminating reactions. The additional, beyond one, amine groups can be derived from an amine or imine containing intiator or from the polymer having two or more amine containing terminating groups per polymer. The possibility of having multiple amine containing terminating groups exists because in anionic polymerization a polymer may have more than one growing anionic chain end. Difunctional initiators are available that initiate two growing ends or there are processes where additional anionic growing ends are generated on pendant or backbone segments of an already growing polymer. Thus any method of generating multiple anionic chain ends on the same molecule is acceptable for forming multiple amine containing terminal groups on a single polymer.

The possibility of having two or more amine reactive groups on a single polymer creates a possibility of reacting (chemically or physically associating or otherwise) the multiple amine containing groups of a polymer with two separate carboxyl containing polymers or maleated polymers.

The anionic polymerization of amine terminated polymers from conjugated dienes, optionally with vinyl aromatic monomers, can be conducted under conventional anionic polymerization conditions with conventional anionic initiators. Optionally anionic initiators containing other functional groups such as amines, imines hydroxyls, etc. suitably blocked or prereacted can be used if a difunctional polymer is desired. At least one end of such difunctional polymers would be functionalized with an amine and the other one or more ends could be an amine, hydroxyl or other functional or nonfunctional group. Generally a functional group is defined as a group other than an alkyl group which will be capable of associating with another functional group of another molecule or polymer to form a linkage or a more compatible blend. Preferred functional groups include amides, amines, carboxyl, carbonyl, anhydrides of dicarboxylic acids, hydroxyl, epoxies, etc. Nonfunctional groups are generally define as alkyl groups. Of course functional groups reactive with each other may cause chain extension or coupling when simultaneously present during or subsequent to polymerization.

The solvents for these anionic polymerizations will depend upon the monomers to be polymerized, the need to prevent chain transfer (or other polymerization terminating events) and the need to solubilize the resulting polymers. Generally, hydrocarbon solvents e.g. hexane are used for anionic polymerizations. More polar solvents such as ethers may be used or mixed with hydrocarbon solvents to promote copolymerization of monomers or to influence the randomness of enchainment of repeat units from conjugated dienes.

The number average molecular weight of the anionically formed polymers formed will generally have a relationship to the total grams of monomer divided by the total moles of active initiator. Thus the molecular weight can generally be increased by increasing the number of moles of monomer or decreasing the number of moles of initiator that is active in initiating polymerization. Similarly the molecular weight can be decreased by the opposite modifications. The molecular weight will also be affected by chain coupling, but coupling will be minimized by the functionalization methods of this disclosure that result in amine terminal groups.

Some preferred functionalizing agents for the anionic polymerization are imines having the formula:

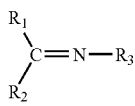

wherein $R_1$ and $R_2$, independently, are H, alkyl of from 1 to 20 carbon atoms, cycloalkyl of from 3 to 12 carbon atoms, aryl of from 6 to 20 carbon atoms, dialkylaminoaryl of from 8 to 20 carbon atoms, aralkyl of from 7 to 20 carbon atoms and aprotic O,N and S containing alkyl, cycloalkyl, aryl, and aralkyl groups with similar ranges of carbon atoms as set forth above; wherein $R_3$ is selected from the same group as $R_1$ and $R_2$, except $R_3$ cannot be H. Aprotic groups are defined as groups which do not donate protons. The aprotic limitation is inserted herein as aprotic materials are generally non-reactive with the anionic initiators and growing anionically polymerized polymer chains minimizing side reactions.

The imine can be prepared by reacting an aldehyde or ketone of the formula

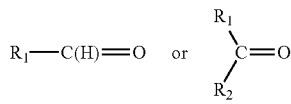

with an amine of the formula $H_2NR_3$ wherein $R_1$, $R_2$, and $R_3$ are as defined above for the imine. An aldehyde reacted with an amine produces an aldimine and a ketone reacted with an amine produces a ketimine. For the purpose of this specification, imine includes both aldimine and ketimine.

The imine molecules of this disclosure acts as a monomer and adds to the growing anionic chain end of a polymer as shown below. The polymer is designated with a "P", the anion is shown with a ⊖ and the counterion for illustration purposes is $L_i$.

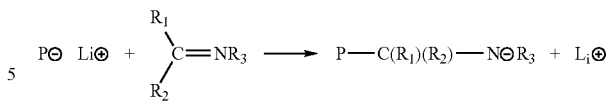

Thus the growing chain forms a bond to the carbon of the imine linkage and the nitrogen of the imine linkage takes on a negative charge. The anionic charge on the nitrogen can add another monomer, if monomer is available, and if the steric constraints around the anionic charge do not restrict the approach of other monomers to the active anionic chain end. If another monomer is not added, the nitrogen atom can bond to a hydrogen or other portion of a protic material losing the anionic charge and terminating that polymer.

After a substantial portion of all the growing anionic chain ends have been functionalized with an amine (from the reaction of the chain end with an imine molecule), they can be terminated with a conventional protic terminating agent such as water or an alcohol. The protic material is used in an amount sufficient to terminate the anionic polymerization. Desirably the above-described functionalization and termination reaction results in at least 50, more desirably at least 60 and preferably at least 70 percent of the growing anionic chain ends being terminated with at least one secondary amine containing terminal group derived from an imine.

The terminal group on the anionically polymerized polymer is thus desirably —$C(R_1)(R_2)$—$N(H)R_3$ where $R_1$, $R_2$ and $R_3$ are as previously defined.

The reaction product (compatibilized blend) of the first polymer and the second polymer is desirably formed by mixing the first polymer and second polymer at a temperature above their softening temperatures in a mechanical mixer. The mixer can be an internal mixer, e.g. Brabender™ or a mixer such as a multiple roll mixer, e.g. two roll rubber mill. The mixer may be a batch mixer, e.g. Banbury™ type or a continuous mixer, e.g. multiple screw or other mixing extruder. Desirable mixing temperatures are from about 50° C. to about 250° C., more desirably from about 100° C. to about 240° C., and preferably from about 150° C. to about 230° C. Residence time can vary with the intensity of the mixing. Generally mixing time can vary from a few seconds to minutes or fractions of an hour. Preferred mixing times are from about 20 seconds to about 20 minutes.

The reaction product is defined as a compatibilized blend because the chemical interaction between the carboxylic acid group or anhydride of two carboxylic acid groups of the first polymer with the amine containing group of the second polymer has not been confirmed. It may be a weak acid interaction with a weak base. It may be that the addition of the amine groups just modify the polarity of the second polymer enough to improve the interdispersibility of the two polymers. In any event, a measurable improvement in the physical properties of the blend of the first and second polymers is seen as a result of using a second polymer with said amine containing terminal groups from the imine reactant. Thus, the term reaction product is meant to include physical blends with chemical or physical interactions between the first and second polymers that have an effect on the compatibility or blendability of the two or more polymers. Desirably, the changes result in the improvements in the physical properties of the blends such as an increase in the modulus, tensile strength at break, etc.

The reaction product of the first and second polymer are useful as molding compositions, molded articles, etc. The products are especially useful where molded articles are desired with a substantial amount of flexibility or vibration damping.

The following examples show how to prepare an amine containing terminating agent, how to aminate a polybutadienyllithium, how to prepare a reaction product of a maleated polymer and an amine group terminated polybutadiene, and an evaluation of the physical properties of the resulting reaction product.

1). Preparation of Butylidenebenzylamine (V).

This material is a known compound prepared in the standard fashion. To about 100 mL of toluene was added 28 mL of butyraldehyde, 34 mL of benzylamine, and several grams of 3A molecular sieves. The mixture became warm and turbid after standing for a few minutes. After standing for several hours the mixture was colorless and transparent. The imine product was isolated by distillation under vacuum and characterized by NMR spectroscopy.

2). Preparation of Amine Terminated Elastomers for Grafting Experiments.

Run 1: A large beverage bottle was baked overnight in an oven and allowed to cool under a nitrogen purge. The bottle was charged with about 271. g of hexane solution having about 24.9 wt. % butadiene (1.20 moles of Bd) and about 0.81 mL of a 1.6 M hexane solution of n-butyllithium (1.30 milliequivalents). The bottle was tumbled for about 5 hours in 50° C. water bath, 0.33 mL of N-butylidenebenzylamine was then added, and the bottle was tumbled in the bath for about 2 hours more. The polymerization was terminated with 5 mL of isopropanol, the polymer was stabilized with BHT, and the polymer (Example Elastomer 1) was isolated by drum drying the cement (polymer). A control polymer (Control Elastomer A) was prepared in the same way, except no N-butylidenebenzylamine was added.

3). Preparation of a Polymer Blend.

Commercial maleated polypropylene of approximately 135,000 weight average molecular weight and about 0.4 weight percent succinic acid and/or succinate functionalized propylene repeat units was charged into a Brabender™ mixer of 50 g capacity under a stream of nitrogen. The mixing speed was set to 60 RPM and the mixing head temperature was set to 230° C. When the mixer had warmed to 225–230° C., a sample of N-butylidenebenzylamine functionalized polybutadiene was added to the maleated polypropylene (having succinic acid or succinate) in the mixer and the mixing speed was increased to 90 RPM. When the temperature of the mixer again reached 225–230° C., the heating element was turned off and the mixture was allowed to cool to about 170° C. The agitation was turned off and the polymer was removed from the mixer. The amounts of maleated polypropylene and functionalized polybutadiene were such that the maleated polypropylene constituted 35% by weight of the final product. Control unfunctionalized polybutadienes (Control Elastomer A described above) was also mixed with the maleated polypropylene in the same manner.

The reaction products from blending the polymer blends were molded into sheets by pressing the samples in a suitable die. The polymer blend from the Example Elastomer 1 (functionalized polybutadiene) could not be molded at temperatures less than about 170° C., but the polymer blend from the Control Elastomer A was easily molded at temperatures of about 100° C. This 70° C. difference in molding temperature is believed to be indicative of physical interaction etc., of the amine terminated poly-butadiene with the maleated polypropylene in Example Elastomer 1 blend. Samples of the polymer blends were cut from these sheets for tensile measurements. The results are in Table 1. The processability of all of the polymer blends indicates that they are not extensively crosslinked.

The measurements show that the polymer blend derived from the amine functionalized polybutadiene is stronger and harder (can be extended to higher strain levels and require greater stress to induce breakage) than the polymer blend from the control, providing evidence of an association or interaction between the maleated polypropylene and N-butylidenebenzylamine terminated (functionalized) polybutadienes.

TABLE 1

Physical Properties of Products Obtained from Mixing Polymer Blends

| Maleated Polypropylene | Elastomer | Blended Product Max. Stress MPa (PSI)[a] | Blended Product Max. Strain (%)[a] | Blended Product Hardness (Shore A) |
|---|---|---|---|---|
| Commercial | Control A | 2.19 (317.5) | 7.2 | 65 |
| Commercial | Example 1 | 6.22 (902.2) | 48.4 | 90 |

[a]From tensile strength measurements on dumbbells.

Blends of a maleated polypropylene and an amine terminated polybutadiene as set forth in Run 1 were mixed in a similar manner but with a 50:50 weight ratio. A control with a 50:50 weight ratio of maleated polypropylene and polybutadiene was prepared with the same mixing procedure. Both samples were cryogenically ground and extracted with hexane for 24 hours using a soxhlet extractor. About 39 weight percent of the polybutadiene was extracted from the control while only 21 weight percent of the polybutadiene was extracted from the sample which started with amine terminated poly(butadiene). This further illustrates by the 50% reduction in extractable polybutadiene, that the amine functionalization of polybutadiene results in an interaction between the polybutadiene and maleated polypropylene.

While in accordance with the patent statutes the best mode and preferred embodiment has been set forth, the scope of the invention is not limited thereto, but rather by the scope of the attached claims.

What is claimed is:

1. A process for forming a compatibilized blend, comprising;
   a) providing a first polymer having at least one carboxylic acid functional group or at least one anhydride of two carboxylic acid groups, or a combination thereof, terminal or pendant to said first polymer, or combinations thereof,
   b) anionically polymerizing a second polymer from at least one conjugated diene monomer having from 4 to 8 carbon atoms or at least one vinyl aromatic monomer having from 8 to 20 carbon atoms, or combinations thereof, and functionalizing said second polymer by reacting a growing anionic end of said second polymer with an imine, thereby forming at least one amine containing terminal group on said polymer, and
   c) mixing and forming a compatibilized blend of said first polymer and said second polymer at a temperature above the softening temperature of said first and second polymers.

2. A process according to claim 1, wherein said first polymer is reacted with said second polymer in a continuous or batch mechanical mixer at a temperature from about 100° C. to about 240° C.

3. A process according to claim 2, wherein said at least one carboxylic acid group or said cat least one anhydride of two carboxylic acid groups, or combination thereof, of said first polymer is derived from the reaction of maleic acid or maleic anhydride with a polymer, or the polymerization of maleic anhydride with at least one olefin monomer.

4. A process according to claim 2, wherein at least 80 weight percent of said first polymer is repeat units derived from the polymerization of one or more alpha-mono-olefins having from 2 to 3 carbon atoms.

5. A process according to claim 4, wherein at least 80 weight percent of said first polymer is repeat units derived from propylene.

6. A process according to claim 5, wherein at least 40 weight percent of said second polymer is repeat units derived from the polymerization of at least one conjugated diene monomer having from 4 to 8 carbon atoms.

* * * * *